United States Patent
Wakabayashi et al.

(10) Patent No.: US 8,587,863 B2
(45) Date of Patent: Nov. 19, 2013

(54) WAVELENGTH CONVERSION DEVICE, SOLID-STATE LASER APPARATUS, AND LASER SYSTEM

(75) Inventors: Osamu Wakabayashi, Kanagawa (JP); Takashi Onose, Tochigi (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/568,232

(22) Filed: Aug. 7, 2012

(65) Prior Publication Data

US 2013/0039372 A1  Feb. 14, 2013

(30) Foreign Application Priority Data

Aug. 12, 2011  (JP) ................................ 2011-177036

(51) Int. Cl.
  *G02F 1/35* (2006.01)
  *G02F 2/02* (2006.01)
  *H01S 3/04* (2006.01)

(52) U.S. Cl.
  USPC ............................................ 359/328; 372/35

(58) Field of Classification Search
  USPC ............... 359/326–332; 385/122; 372/21–22, 372/34–36
  See application file for complete search history.

(56) References Cited

U.S. PATENT DOCUMENTS

| | | | |
|---|---|---|---|
| 5,640,480 A * | 6/1997 | Komine | 385/122 |
| 5,761,226 A * | 6/1998 | Gupta | 372/22 |
| 5,898,718 A * | 4/1999 | Mohatt et al. | 372/22 |
| 6,215,580 B1 * | 4/2001 | Kouta | 359/328 |
| 6,240,111 B1 * | 5/2001 | Kubota et al. | 372/21 |
| 6,859,305 B2 | 2/2005 | Chen et al. | |
| 7,039,076 B2 * | 5/2006 | Kane et al. | 372/6 |
| 7,630,125 B2 * | 12/2009 | Wu et al. | 359/326 |
| 8,243,764 B2 * | 8/2012 | Tucker et al. | 372/21 |
| 8,339,697 B2 * | 12/2012 | Horikawa et al. | 359/326 |

FOREIGN PATENT DOCUMENTS

| | | |
|---|---|---|
| JP | 01202717 A * | 8/1989 |
| JP | 2008-040293 | 2/2008 |
| JP | 2008-286889 | 11/2008 |

* cited by examiner

*Primary Examiner* — Daniel Petkovsek
(74) *Attorney, Agent, or Firm* — IPUSA, PLLC (57) ABSTRACT

A wavelength conversion device may include a wavelength conversion element that converts an entering first laser beam into a second laser beam by wavelength conversion, and a cooling mechanism that cools the wavelength conversion element from at least one surface of the wavelength conversion element.

25 Claims, 9 Drawing Sheets

WAVELENGTH CONVERSION DEVICE, SOLID-STATE LASER APPARATUS, AND LASER SYSTEM

CROSS-REFERENCE TO RELATED APPLICATION

The present application claims priority from Japanese Patent Application No. 2011-177036 filed Aug. 12, 2011.

BACKGROUND

1. Technical Field

The present disclosure relates to wavelength conversion devices, solid-state laser apparatuses, and laser systems.

2. Related Art

Typical excimer lasers as ultraviolet light sources for use in semiconductor lithography are KrF excimer lasers whose output wavelength is approximately 248 nm and ArF excimer lasers whose output wavelength is approximately 193 nm.

Most of the ArF excimer lasers are marketed as two-stage laser systems including an oscillator stage laser and an amplifier stage. Common major components of the oscillator stage laser and the amplifier stage in two-stage ArF excimer laser systems include the following. The oscillator stage laser includes a first chamber, while the amplifier stage includes a second chamber. The first and second chambers contain laser gas (a mixture gas of $F_2$, Ar, Ne, and Xe) sealed therein. The oscillator stage laser and the amplifier stage are provided with a power supply for supplying electric energy for exciting the laser gas. The oscillator stage laser and the amplifier stage may have separate power supplies or share a common power supply. Inside the first chamber, first discharge electrodes including a first anode and a first cathode that are connected to the power supply are provided. In a similar manner, second discharge electrodes including a second anode and a second cathode that are connected to the power supply are provided inside the second chamber.

The specific features of the conventional oscillator stage laser include, for example, a line narrowing module. The line narrowing module typically includes a grating and at least one prism beam expander. A semitransparent mirror and the grating constitute an optical resonator. The first chamber of the oscillator stage laser is arranged between the semitransparent mirror and the grating.

When an electric discharge occurs between the first anode and the first cathode of the first discharge electrodes, the laser gas is excited, thereby emitting light upon releasing the excitation energy. The light is then subjected to wavelength selection by the line narrowing module and the resulting light is output as laser beam from the oscillator stage laser.

A two-stage laser system whose amplifier stage is a laser including a resonator is called a master oscillator/power oscillator (MOPO), while a two-stage laser system whose amplifier stage is not a laser without a resonator is called a master oscillator/power amplifier (MOPA). When a laser beam from the oscillator stage laser is present in the second chamber of the amplifier stage, control is performed so that an electric discharge occurs between the second anode and the second cathode of the second discharge electrodes. As a result, the laser gas in the second chamber is excited, the laser beam is amplified, and the resulting light is output from the amplifier stage.

SUMMARY

A wavelength conversion device according to an aspect of the present disclosure may include a wavelength conversion element that converts an entering first laser beam into a second laser beam by wavelength conversion, and a cooling mechanism that cools the wavelength conversion element from at least one surface of the wavelength conversion element.

A solid-state laser apparatus according to another aspect of the present disclosure may include a laser that outputs a laser beam, an amplifier that amplifies the laser beam, and the aforementioned wavelength conversion device that converts the wavelength of the amplified laser beam.

A laser system according to another aspect of the present disclosure may include the aforementioned solid-state laser apparatus and an amplifying apparatus that amplifies laser beam outputted from the solid-state laser apparatus.

BRIEF DESCRIPTION OF DRAWINGS

Exemplary embodiments of the present disclosure will be described hereinafter with reference to the appended drawings.

DESCRIPTION OF EMBODIMENTS

Selected embodiments of this disclosure will be described in detail with reference to the accompanying drawings. The embodiments described below are for illustrative purposes only, and are in no way intended to unduly limit what is described in this disclosure. In addition, not all the structures or operations described in these embodiments are indispensable to put this disclosure into practice. It should be noted that the same numerals refer to the same components and duplicated description thereof is omitted. The description will be given in the order below.

CONTENTS

1. Outline
2. Explanation of Terms
3. Laser System Including Solid-State Laser Apparatus Having Wavelength Conversion Element and ArF Amplifier (First Embodiment)
   3.1 Configuration
   3.2 Operations
4. Wavelength Conversion Device Having Cooling Mechanism Provided on Part of at Least One Surface of Nonlinear Optical Crystal (Second Embodiment)
   4.1 Configuration
   4.2 Operations
   4.3 Effects
   4.4 Examples of Cooling Mechanisms
   4.4.1 Air-Cooling System (First Working Example)
   4.4.2 Peripheral Cooling System (Second Working Example)
   4.4.3 Direct Cooling System through at Least a High-Reflective Film (Third Working Example)
   4.4.4 Cooling System through High-Heat Thermal Conductive Film (Fourth Working Example)
   4.4.5 Cooling System through High-Reflective Film and High-Heat Thermal Conductive Film (Fifth Working Example)
5. Wavelength Conversion Device Combining Multiple Prisms and Cooling Mechanism (Third Embodiment)
   5.1 Combination of Entry Prism, Exit Prism, and Cooling Mechanism (First Working Example)
   5.2 Combination of Entry Prism, Exit Prism, and Cooling Mechanisms (Second Working Example)
   5.3 Combination of Entry Prism, Exit Prism, and Cooling Mechanisms (Third Working Example)
6. Wavelength Conversion Device Incorporating Cooling Mechanism when Light Enters or Exits from End Surface of Nonlinear optical crystal (Fourth Embodiment)

1. Outline

In the embodiments described as examples hereinafter, the surface of a nonlinear optical crystal may be coated with a film. This film may be optically contacted to the surface of the prism.

2. Explanation of Terms

"KBBF crystal" refers to a nonlinear optical crystal expressed by the chemical formula $KBe_2BO_3F_2$. "Burst oscillation" refers to outputting a pulsed laser beam at a predetermined repetition rate during a predetermined interval. An "optical path" is a path along which a laser beam is transmitted.

3. Laser System Including Solid-State Laser Apparatus Having Wavelength Conversion Element and ArF Amplifier (First Embodiment)

3.1 Configuration

Figure 1A:
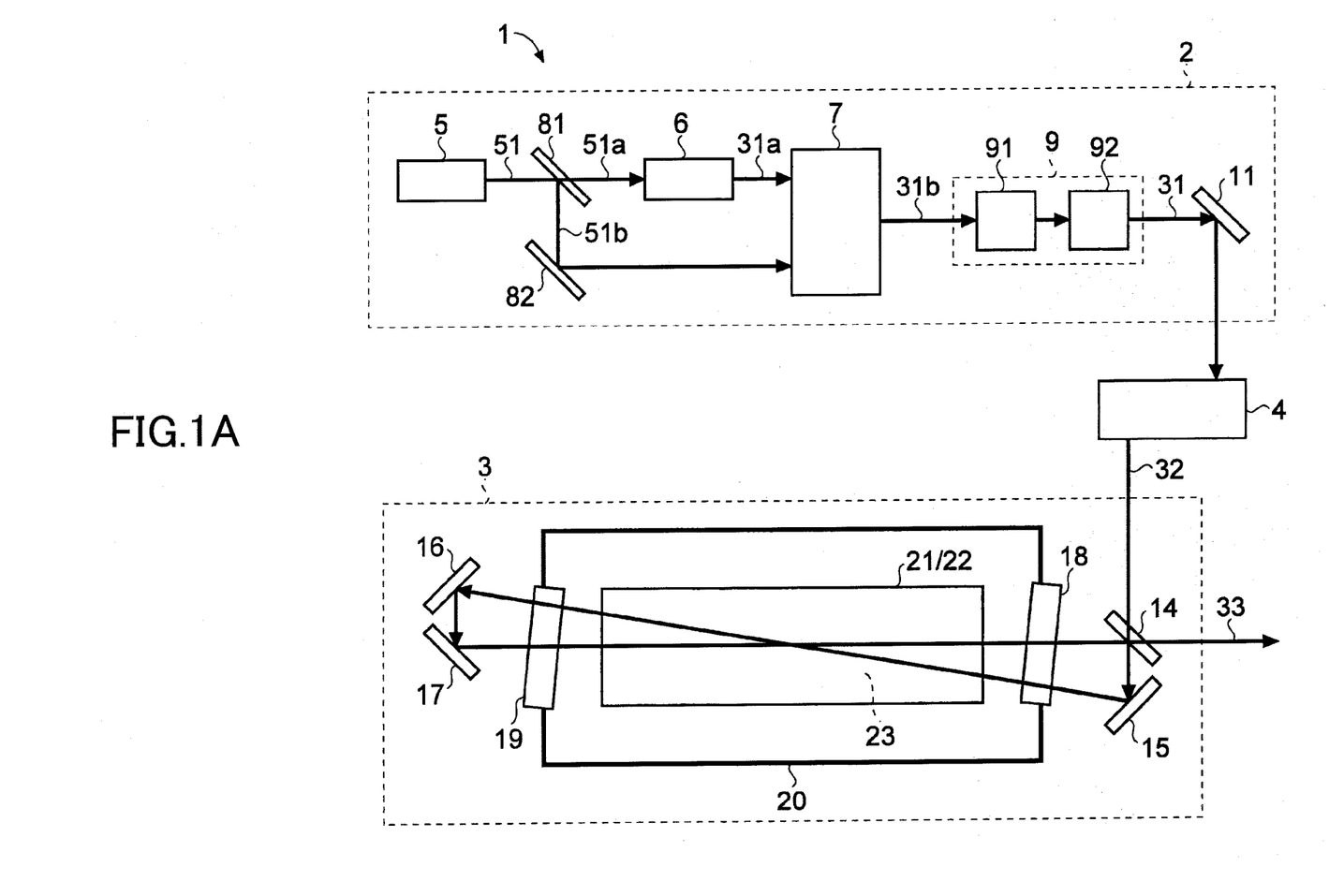
FIG. 1A illustrates the overall configuration of an example of a two-stage laser apparatus according to a first embodiment of the present disclosure.
Figure 1B:
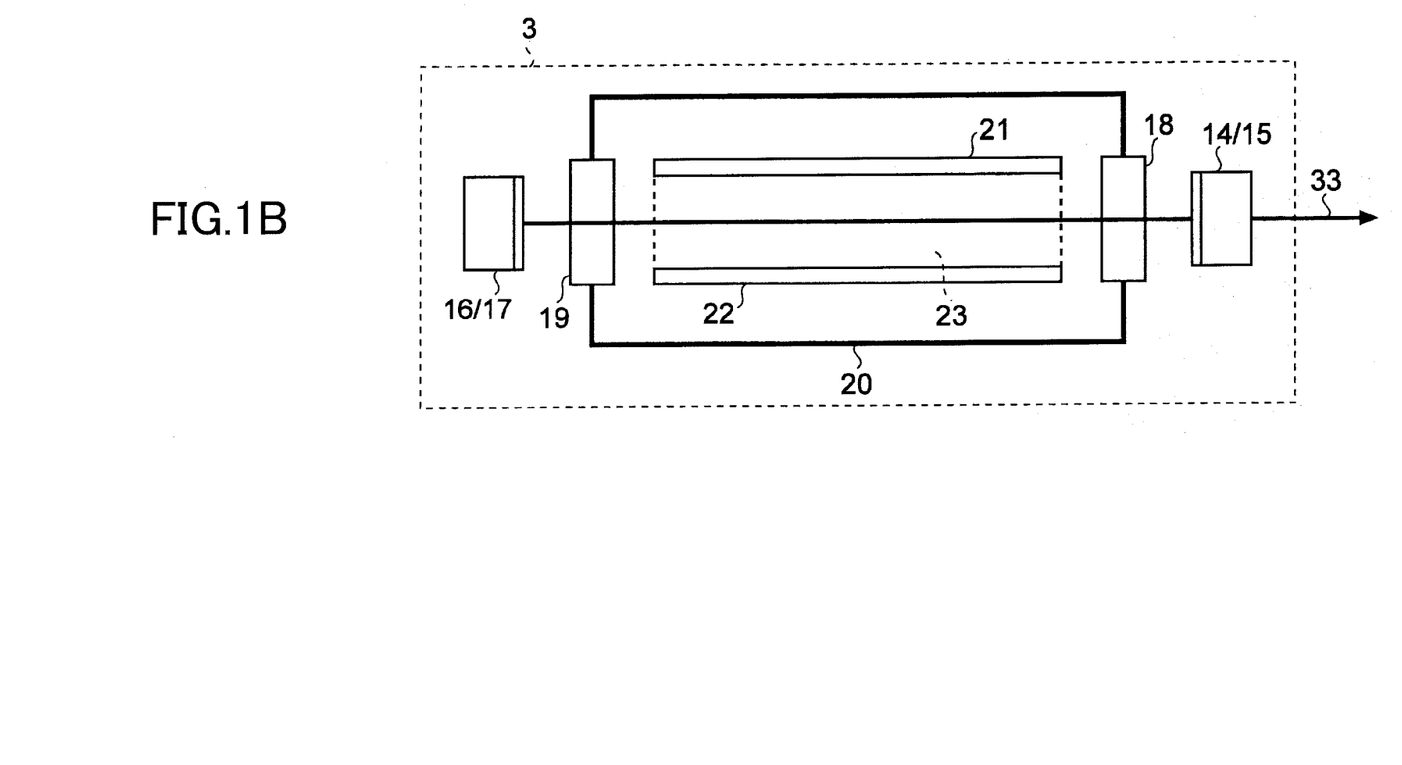
FIG. 1B illustrates the overall configuration of an example of an amplifying apparatus illustrated in FIG. 1A.

FIG. 1A illustrates the overall configuration of an example of a two-stage laser apparatus according to a first embodiment of the present disclosure. FIG. 1B illustrates the overall configuration of an example of an amplifying apparatus illustrated in FIG. 1A. Note that FIG. 1B illustrates the overall configuration through a cross-section of an amplifying apparatus 3 that differs from the cross-section shown in FIG. 1A.

As shown in FIGS. 1A and 1B, a two-stage laser apparatus (called a "laser system" hereinafter) 1 may include a solid-state laser apparatus 2 and the amplifying apparatus 3. The solid-state laser apparatus 2 may, for example, include a wavelength conversion element. The amplifying apparatus 3 may, for example, be a discharge-excited ArF excimer amplifier. A coherence reduction optical system 4 may be disposed between the solid-state laser apparatus 2 and the amplifying apparatus 3. A system such as an optical pulse stretcher, a random phase plate, or the like may be employed as the coherence reduction optical system 4.

Next, the solid-state laser apparatus 2 will be described. The solid-state laser apparatus 2 may include a pumping laser 5, a Ti:sapphire laser 6, an amplifier 7, a beam splitter 81, a high-reflection mirror 82, a wavelength conversion device 9, and a high-reflection mirror 11.

The pumping laser 5 may be a laser that, for example, outputs second harmonic light of a semiconductor laser-pumped Nd: YAG laser. The Ti:sapphire laser 6 may include a Ti:sapphire crystal and an optical resonator. The amplifier 7 may be an amplifier that includes a Ti:sapphire crystal. The wavelength conversion device 9 may include a first wavelength conversion element 91 and a second wavelength conversion element 92. The first wavelength conversion element 91 may include an LBO crystal as its wavelength conversion element. The second wavelength conversion element 92 may include a KBBF crystal as its wavelength conversion element.

The amplifying apparatus 3 will now be described. The amplifying apparatus 3 may include a chamber 20, a pair of discharge electrodes (namely, an anode 21 and a cathode 22), an output coupling mirror 14, highly reflective mirrors 15, 16, and 17. The chamber 20 may contain laser gas sealed therein. This laser gas may be a mixture of Ar, Ne, $F_2$, and Xe gases. The anode 21 and the cathode 22 may be housed in the chamber 20. The anode 21 and the cathode 22 may be arranged with a space therebetween in a direction along the plane of FIG. 1B. The anode 21 and the cathode 22 may be arranged perpendicular to the plane of FIG. 1B. A space between the anode 21 and the cathode 22 may be a discharge space 23. The chamber 20 may be provided with windows 18 and 19 through which pulsed laser beam 32 passes. In addition, a power supply (not illustrated) may be provided outside the chamber 20.

The output coupling mirror 14 and the highly reflective mirrors 15, 16, and 17 may constitute an optical ring resonator. The output coupling mirror 14 may be an element for allowing part of the light to pass therethrough and reflecting the other part of the light.

3.2 Operations

The solid-state laser apparatus 2 may output pulsed laser beam 31 at a wavelength of approximately 193 nm. The coherence reduction optical system 4 may reduce the coherence of the pulsed laser beam 31. The amplifying apparatus 3 may amplify pulsed laser beam 32 whose coherence has been reduced and output the resultant light as pulsed laser beam 33. The pulsed laser beam 33 may be sent to a semiconductor exposure apparatus (not illustrated) and used for exposure processing.

The pumping laser 5 may output excitation light (also referred to as pumping light) 51 at a wavelength of approximately 532 nm. Part of the excitation light 51 may pass through the beam splitter 81. The other part of the excitation light 51 may be reflected by the beam splitter 81. The excitation light 51 having passed through the beam splitter 81 may excite the Ti:sapphire crystal in the Ti:sapphire laser 6. The Ti:sapphire laser 6 thus excited may output pulsed laser beam at a wavelength of approximately 773.6 nm. The Ti:sapphire laser 6 may include an optical resonator having a wavelength selection element (not illustrated). Accordingly, the Ti:sapphire laser 6 may output pulsed laser beam 31a whose spectral linewidth has been narrowed by the wavelength selection element.

Of the excitation light 51 having been output from the pumping laser 5, the light reflected by the beam splitter 81 may be reflected again by the highly reflective mirror 82. The excitation light 51 thus reflected may enter the Ti:sapphire amplifier 7 and excite the Ti:sapphire crystal included in the amplifier. With this excitation energy, the amplifier 7 may amplify the pulsed laser beam output from the Ti:sapphire laser 6. As a result, the amplifier 7 may output pulsed laser beam 31b at a wavelength of approximately 773.6 nm.

The pulsed laser beam 31b output from the Ti:sapphire amplifier 7 may pass through the LBO crystal 9, serving as a wavelength conversion element, to be converted into pulsed laser beam 31b at a wavelength of approximately 386.8 nm (half the aforementioned wavelength 773.6 nm). The pulsed laser beam 31b whose wavelength has been converted may pass through the KBBF crystal, serving as a wavelength conversion element, to be converted into the pulsed laser beam 31 at a wavelength of approximately 193.4 nm (half the aforementioned wavelength 386.8 nm).

The pulsed laser beam 31 having passed through the KBBF crystal may be directed by the reflective mirror 11 to enter the coherence reduction optical system 4. The coherence of the pulsed laser beam 31 may be reduced upon passing through the coherence reduction optical system 4. The pulsed laser beam 32 whose coherence has been reduced may enter the amplifying apparatus 3.

A power supply electrically connected to the anode 21 and the cathode 22 in the chamber 20 may apply a potential difference between the anode 21 and the cathode 22. This may cause a discharge between the anode 21 and the cathode 22 every time the pulsed laser beam 32 passes through the discharge space 23 in the amplifying apparatus 3.

Part of the pulsed laser beam 32 output from the coherence reduction optical system 4 may pass through the output coupling mirror 14 and be reflected by the highly reflective mirror 15. This pulsed laser beam 32 may pass through the window 18 and enter the discharge space 23 between the anode 21 and the cathode 22. Control may be made to cause a discharge in the discharge space 23 with the presence of this pulsed laser beam 32 in the discharge space 23, thereby amplifying the pulsed laser beam 32. The pulsed laser beam 32 thus amplified may be output from the chamber 20 through the window 19. The pulsed laser beam 32 thus output may be highly reflected by the highly reflective mirrors 16 and 17 and enter the discharge space 23 in the chamber 20 through the window 19 again. This pulsed laser beam 32 may then be output from the chamber 20 through the window 18. This pulsed laser beam 32 thus output may be incident on the output coupling mirror 14. Part of this pulsed laser beam 32 may pass through the output coupling mirror 14 and be output from the amplifying apparatus 3 as pulsed laser beam 33. The other part of this pulsed laser beam 32 may be reflected by the output coupling mirror 14 and returned to the optical ring resonator as feedback light.

While the description above pertains to an example in which the amplifying apparatus 3 includes an optical ring resonator, embodiments are not limited thereto. For example, the amplifying apparatus 3 may include a Fabry-Perot resonator in which an optical resonator is provided in an amplifier.

Note that in the first embodiment, the wavelength conversion device 9 of a solid-state laser and the laser system 1 that includes the wavelength conversion device 9 are illustrated as examples. Accordingly, the coherence reduction optical system 4, the amplifying apparatus 3, and so on in FIG. 1A are not required constituent elements in the present disclosure. In addition, the pulsed laser beam 31b prior to the wavelength conversion performed by the wavelength conversion device 9 need not be a laser beam outputted from the laser apparatus including the Ti:sapphire laser 6.

4. Wavelength Conversion Device Having Cooling Mechanism Provided on Part of at Least One Surface of Nonlinear Optical Crystal (Second Embodiment)

Next, a wavelength conversion device according to a second embodiment of the present disclosure will be described in detail using the drawings. In the second embodiment, the portion described as the second wavelength conversion element 92 in the first embodiment will be focused on, and the configuration thereof will be described in more detail. Note that the first wavelength conversion element 91 may also have the same configuration as that described as an example herein after.

4.1 Configuration

Figure 2:
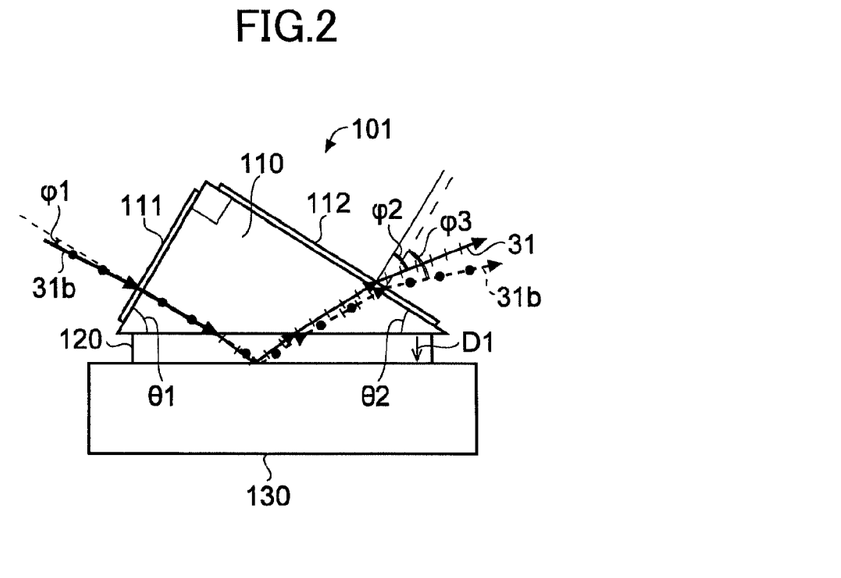
FIG. 2 is a schematic diagram illustrating the overall configuration of a wavelength conversion device according to a second embodiment of the present disclosure.

The second embodiment describes an example of a wavelength conversion device in which at least an optical element for refractive index adjustment (i.e. a refractive index adjustment element) makes contact with a surface of a wavelength conversion element (for example, a KBBF crystal). The refractive index adjustment element may be, for example, a prism. FIG. 2 schematically illustrates the overall configuration of a wavelength conversion device 101 according to the second embodiment. As shown in FIG. 2, the wavelength conversion device 101 may include a prism 110, a KBBF crystal 120, and a cooling mechanism 130.

The material of the prism 110 may be, for example, composite silica. Alternatively, an $SiO_2$ crystal, fused silica glass, a $CaF_2$ crystal, or an $MgF_2$ crystal may be used. It is particularly favorable to use a fluoride-based material that is robust to an ultra violet laser beam for the material of the prism 110.

The prism 110 may, for example, be a rectangular prism whose vertical surfaces and base surface form a right-angle triangle. Hereinafter, for descriptive purposes, of the three side surfaces of the prism 110, the side surface that includes the angled side of the right-angle triangle will be referred to as a "contact surface". Of the remaining two side surfaces, one will be referred to as an "entry surface", and the other will be referred to as an "exit surface".

The entry surface of the prism 110 may be coated with an anti-reflection film (AR coating) 111 that reduces the reflection of the pulsed laser beam 31b. The exit surface of the prism 110 may be coated with an anti-reflection film (AR coating) 112 that reduces the reflection of at least the pulsed laser beam 31.

The KBBF crystal 120 may be provided on the contact surface of the prism 110. The contact between the prism 110 and the KBBF crystal 120 may be optical contact. The KBBF crystal 120 may come into direct contact with the prism 110, or may make contact with a film (not shown) interposed there between. This film may be formed on the prism 110, or may be formed on the KBBF crystal 120. Meanwhile, this film may be a film that includes at least one of $SiO_2$, $MgF_2$, $LaF_3$, and $GdF_3$. It is particularly favorable to use a fluoride-based material that is robust to an ultra violet laser beam for the material of the film. It is preferable to use the same type of material as the material of the prism 110 for the material of the film.

The KBBF crystal 120 is a nonlinear optical crystal serving as a wavelength conversion element. The KBBF crystal 120 may be replaced with another nonlinear optical crystal serving as the wavelength conversion element. The KBBF crystal 120 may be anchored relative to the prism 110 so that a crystal axis D1 thereof is approximately perpendicular to the contact surface of the prism 110. Hereinafter, for descriptive purposes, the surface of the KBBF crystal 120 that faces the prism 110 will be referred to as a first surface, and the surface on the opposite side of the first surface will be referred to as a second surface.

The cooling mechanism 130 may be provided on the side of the second surface of the KBBF crystal 120. It is acceptable for the cooling mechanism 130 to cool the KBBF crystal 120 from at least one of the surfaces thereof. In the present example, the cooling mechanism 130 cools the KBBF crystal 120 from the second surface.

4.2 Operations

Next, operations of the wavelength conversion device 101 shown in FIG. 2 will be described. In the example shown in FIG. 2, the pulsed laser beam 31b may enter into the prism 110 through the anti-reflection film 111. The pulsed laser beam 31b may be a 2ω laser beam having a wavelength of, for example, 386.8 nm. In addition, the pulsed laser beam 31b may be a linearly-polarized beam whose polarization direction is perpendicular to the crystal axis D1 of the KBBF crystal 120 (vertical, in the drawing shown in FIG. 2). The pulsed laser beam 31b that has entered the prism 110 may enter into the KBBF crystal 120 after passing through the prism 110. However, in the case where a film (not shown) is interposed between the prism 110 and the KBBF crystal 120, the pulsed laser beam 31b may enter into the KBBF crystal 120 from the first surface after passing through the stated film.

A part of the pulsed laser beam 31b that has entered the KBBF crystal 120 from the first surface may be converted into the pulsed laser beam 31, which is, for example, a 4ω laser beam having a wavelength of 193.4 nm, while traveling within the KBBF crystal 120. The pulsed laser beam 31 may be a linearly-polarized beam whose polarization direction is parallel to the crystal axis D1 of the KBBF crystal 120 (horizontal, in the drawing shown in FIG. 2). The converted pulsed laser beam 31 and the remaining pulsed laser beam 31b may be highly reflected by the second surface of the KBBF crystal 120. In the case where, for example, the second surface of the KBBF crystal 120 is in contact with a vacuum or gas (including the atmosphere), it is preferable for the pulsed laser beams 31b and 31 to enter the first surface of the KBBF crystal 120 at the angle at which the pulsed laser beams 31b and 31 highly-reflect off of the second surface in the KBBF crystal 120. Note that the region of the second surface that is in contact with a vacuum or gas (including the atmosphere) should be a region that reflects at least the pulsed laser beams 31b and 31.

The pulsed laser beams 31b and 31 reflected by the second surface may once again travel through the KBBF crystal 120. At this time, the optical path of the pulsed laser beam 31b, which is a 2ω laser beam, and the pulsed laser beam 31, which is a 4ω laser beam, may be split based on the difference in the refractive indexes for the wavelengths. A part of the post-reflection pulsed laser beam 31b that travels within the KBBF crystal 120 may be converted into the pulsed laser beam 31.

After this, the pulsed laser beams 31b and 31 may once again enter into the prism 110. At this time, the pulsed laser beams 31b and 31 may enter into the prism 110 via different optical paths. As a result, the pulsed laser beams 31b and 31 may exit the prism 110 through the anti-reflection film 112 via different optical paths.

Here, in the case where the prism 110 is, for example, a $CaF_2$ crystal, the refractive index thereof is approximately 1.44. In this case, it is preferable to set an elevation angle $\theta 1$ of the entry surface relative to the contact surface of the prism 110 to 58°, and an elevation angle $\theta 2$ of the exit surface relative to the contact surface to 32°. If the pulsed laser beam 31b is caused to enter the entry surface of the prism 110 at an entry angle $\phi 1$ of 0.9°, both the pulsed laser beams 31b and 31 can be highly-reflected or completely reflected by the second surface of the KBBF crystal 120. Note that in this case, the post-reflection pulsed laser beam 31b can exit from the exit surface of the prism 110 at an exit angle $\phi 3$ of 40.3°. In addition, the post-reflection pulsed laser beam 31 can exit from the exit surface of the prism 110 at an exit angle $\phi 2$ of 30.2°.

4.3 Effects

According to the second embodiment, one surface of the KBBF crystal 120 is directly cooled by the cooling mechanism 130. This makes it possible to improve the efficiency at which the KBBF crystal 120 is cooled. As a result, the pulsed laser beam 31b, which has a high optical intensity, can undergo wavelength conversion, which makes it possible to increase the efficiency of the wavelength conversion. In addition, a drop in the wavelength conversion efficiency can be suppressed. Furthermore, a rise in the temperature of the KBBF crystal 120 can be suppressed, and thus the lifespan of the KBBF crystal 120 can be extended.

4.4 Examples of Cooling Mechanisms

Next, examples of specific configurations of the stated cooling mechanism 130 will be described. Note that in the following descriptions, elements that are the same as those described earlier will be given the same reference numerals, and redundant descriptions thereof will be omitted.

4.4.1 Air-Cooling System (First Working Example)

Figure 3:
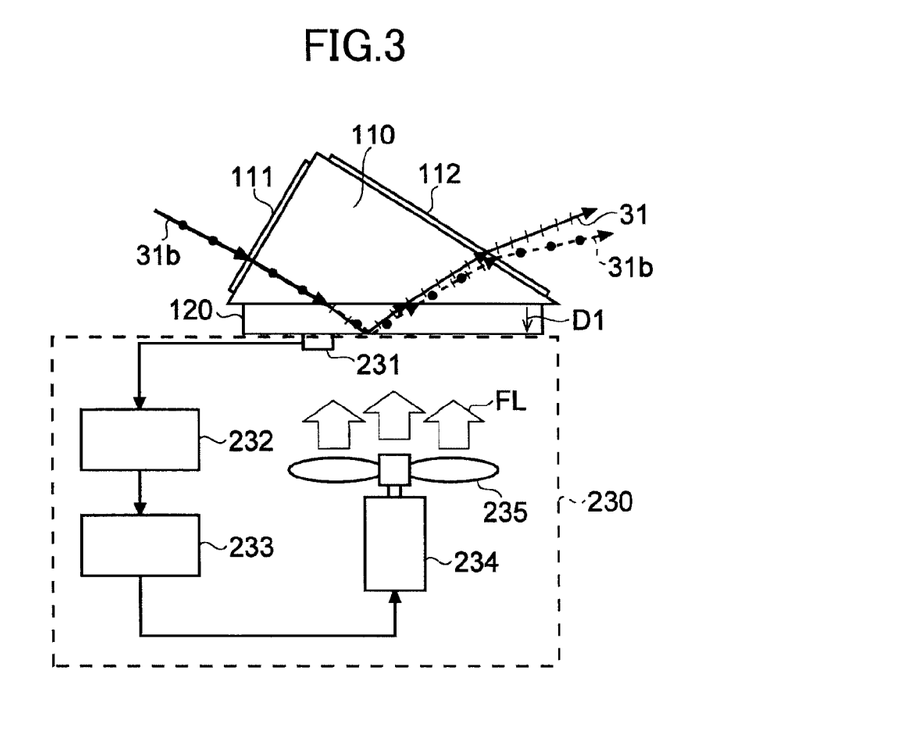
FIG. 3 is a schematic diagram illustrating the overall configuration of a cooling mechanism according to a first working example of the second embodiment.

First, an air-cooling type cooling mechanism 230 will be described as a first working example of the cooling mechanism 130. FIG. 3 schematically illustrates the overall configuration of the cooling mechanism 230 according to the first working example. As shown in FIG. 3, the cooling mechanism 230 may include a temperature sensor 231, a temperature controller 232, a power source 233, a motor 234, and a fan 235. The second surface of the KBBF crystal 120 may be in contact with a gas. This gas may be a pure gas such as, for example, air, nitrogen, an inert gas such as He, Ar, or the like.

The temperature sensor 231 may be provided on the second surface of the KBBF crystal 120. At this time, is it preferable for the temperature sensor 231 to be disposed outside of a region in the second surface that reflects the pulsed laser beams 31b and 31 but in the vicinity thereof. A temperature value detected by the temperature sensor 231 may be inputted into the temperature controller 232.

A rotational shaft of the motor 234 may be attached to the fan 235. The fan 235 may be disposed so as to face the second surface of the KBBF crystal 120. The motor 234 may cause the fan 235 to rotate in accordance with electrical power supplied from the power source 233. Through this, air FL may be blown toward the second surface of the KBBF crystal 120.

The temperature controller 232 may supply electrical power from the power source 233 to the motor 234 based on the inputted temperature value. The temperature controller 232 may supply the electrical power from the power source 233 to the motor 234 so as to achieve a temperature capable of suppressing a drop in the efficiency of the wavelength conversion performed by the KBBF crystal 120 or so as to achieve a temperature that improves the efficiency of the wavelength conversion performed by the KBBF crystal 120.

According to this first working example, the second surface, which is the reflection surface of the KBBF crystal 120, can serve as a surface for contact with a gas, which makes it possible to improve the reflectance of the pulsed laser beams 31b and 31 at the second surface. In addition, the KBBF crystal 120 can be air-cooled from the second surface, which makes it possible to suppress an increase in the temperature of the KBBF crystal 120.

4.4.2 Peripheral Cooling System (Second Working Example)

Figure 4:
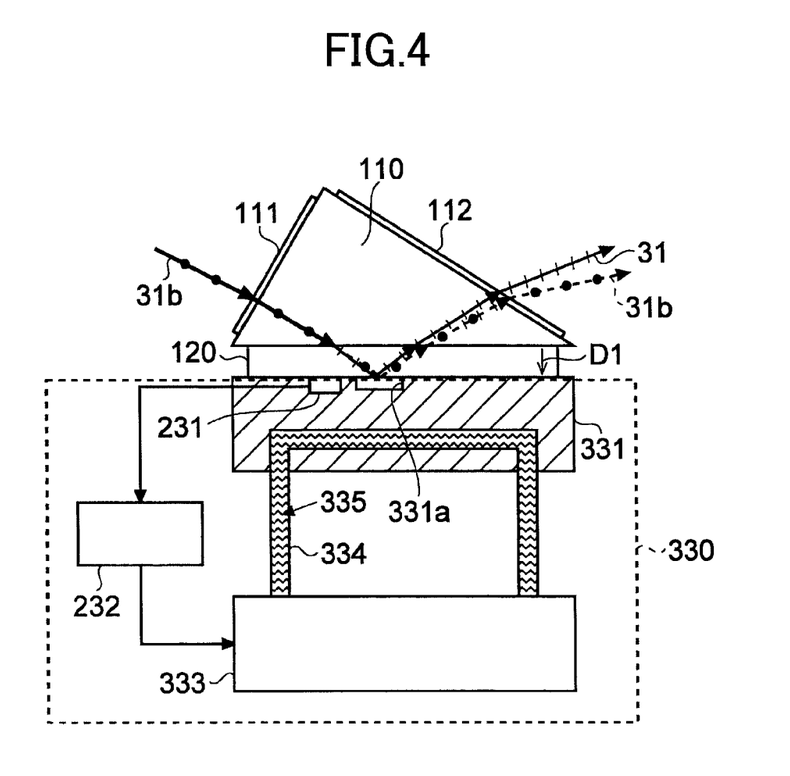
FIG. 4 is a schematic diagram illustrating the overall configuration of a cooling mechanism according to a second working example of the second embodiment.
Figure 5:
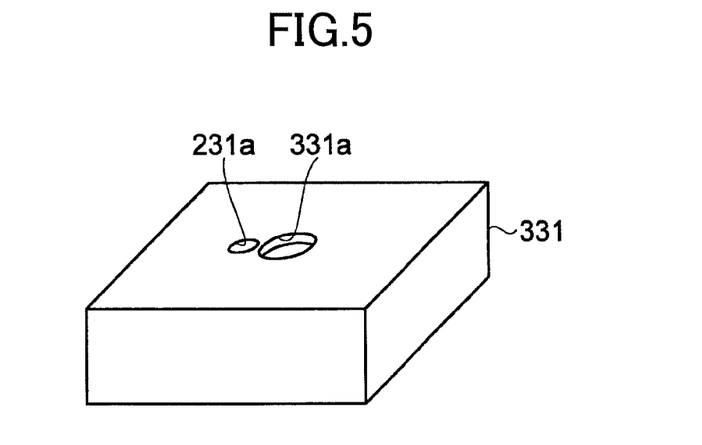
FIG. 5 is a perspective view illustrating the overall configuration of a heatsink shown in FIG. 4.

Next, a liquid-cooling type cooling mechanism 330 will be described as a second working example of the cooling mechanism 130. FIG. 4 schematically illustrates the overall configuration of the cooling mechanism 330 according to the second working example. FIG. 5 is a perspective view illustrating the overall configuration of a heatsink 331 shown in FIG. 4 Note that in the following descriptions, elements that are the same as those described earlier will be given the same reference numerals, and redundant descriptions thereof will be omitted.

As shown in FIG. 4, the cooling mechanism 330 may include the temperature sensor 231, the temperature controller 232, a chiller 333, and a pipe 334. A cooling medium 335 in, for example, liquid form may flow within the pipe 334. The cooling medium 335 may, for example, be pure water.

The heatsink 331 may make contact with the second surface of the KBBF crystal 120. The heatsink 331 is a cooling member that cools the KBBF crystal 120. It is preferable for the heatsink 331 to have a higher thermal conductivity than the KBBF crystal 120. The heatsink 331 may be configured of a metal such as, for example, copper, aluminum, or the like. Alternatively, the heatsink 331 may be configured of a material such as, for example, diamond, silicon carbide, or the like.

The chiller 333 may cool the cooling medium 335 such as water and feed the cooled cooling medium 335 to the pipe 334. The chiller 333 may control at least one of the temperature and flow amount of the cooling medium 335 fed through the pipe 334 under the control of the temperature controller 232. The pipe 334 may be multiple pipes. The pipe 334 may be disposed within the heatsink 331. The heatsink 331 can be cooled with the cooling medium 335 fed through the pipe 334 by passing through the pipe 334 within the heatsink 331. As a result, the KBBF crystal 120 can be cooled. The chiller 333 may once again cool the cooling medium 335 that has returned after cycling through the pipe 334, and may then feed that cooling medium 335 through the pipe 334.

As shown in FIG. 5, the heatsink 331 may have a recess portion 331a in the surface thereof that makes contact with the KBBF crystal 120. The recess portion 331a is not limited to a recess, and may be a through-hole that passes through the heatsink 331. It is preferable for the shape of the opening of the recess portion 331a to resemble the cross-sectional beam shape of the pulsed laser beams 31b and 31.

The recess portion 331a may be provided in a region that corresponds to a region in the second surface of the KBBF crystal 120 that at least reflects the pulsed laser beams 31b and 31. A pure gas such as, for example, air, nitrogen, an inert gas such as He, Ar, or the like may be present within the space formed in the recess portion 331a by bringing the heatsink 331 into contact with the KBBF crystal 120. Alternatively, this space may be maintained in a vacuum state. Setting the space that makes contact with at least the region in the second surface that reflects the pulsed laser beams 31b and 31 to a gaseous atmosphere or a vacuum makes it possible to highly-reflect the pulsed laser beams 31b and 31 off on the second surface.

In addition, as shown in FIG. 5, a recess portion 231a that houses the temperature sensor 231 may be formed in the surface of the heatsink 331 that makes contact with the KBBF crystal 120.

According to the second working example, the region of the second surface of the KBBF crystal 120 aside from the region that reflects the pulsed laser beams 31b and 31 makes contact with the heatsink 331, the KBBF crystal 120 can be cooled directly. Through this, it is possible to increase the cooling efficiency of the KBBF crystal 120. In addition, because the KBBF crystal 120 can be directly cooled by the heatsink 331 from the second surface, which is the main surface of the KBBF crystal 120, a rise in the temperature of the KBBF crystal 120 can be effectively suppressed.

4.4.3 Direct Cooling System through at Least a High-Reflective Film (Third Working Example)

Figure 6:
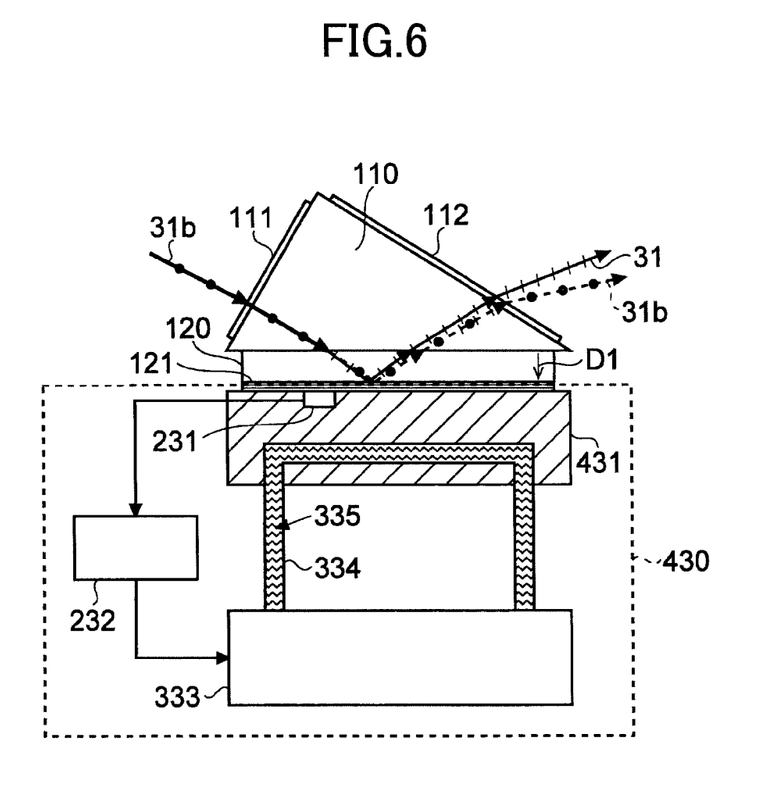
FIG. 6 is a schematic diagram illustrating the overall configuration of a cooling mechanism according to a third working example of the second embodiment.

Next, a cooling mechanism 430 that is a variation on the cooling mechanism 330 according to the second working example will be described as a third working example of the cooling mechanism 130. FIG. 6 schematically illustrates the overall configuration of the cooling mechanism 430 according to the third working example. Note that in the following descriptions, elements that are the same as those described earlier will be given the same reference numerals, and redundant descriptions thereof will be omitted.

As can be seen by comparing FIG. 4 with FIG. 6, the cooling mechanism 430 according to the third working example may have the same configuration as the cooling mechanism 330 according to the second working example. However, with the cooling mechanism 430, the heatsink 331 according to the second working example may be replaced with a heatsink 431 that does not include the recess portion 331a. In addition, the cooling mechanism 430 may further include a high-reflective film 121.

The high-reflective film 121 may be provided between the KBBF crystal 120 and the heatsink 431. The high-reflective film 121 may be a coating film formed on the second surface of the KBBF crystal 120. In this case, the high-reflective film 121 and the heatsink 431 may be formed so as to be in optical contact with each other. However, the invention is not limited thereto. For example, the high-reflective film 121 may be a coating film formed on the heatsink 431. In this case, it is preferable for the high-reflective film 121 and the KBBF crystal 120 to be close-contacted together. Furthermore, the heatsink 431 may be coated with the high-reflective film 121. In this case, it is preferable for the high-reflective film 121 and the KBBF crystal 120 to form an optical contact, and for the high-reflective film 121 and the heatsink 431 to be close-contacted together.

The high-reflective film 121 may highly reflect an S-polarized laser beam having a wavelength of approximately 386.8 nm (the pulsed laser beam 31b) and a P-polarized laser beam having a wavelength of approximately 193.4 nm (the pulsed laser beam 31). The high-reflective film 121 may be a dielectric multilayer film.

The temperature sensor 231 may be disposed between the high-reflective film 121 and the heatsink 431. At this time, is it preferable for the temperature sensor 231 to be disposed outside of a region that reflects the pulsed laser beams 31b and 31 but in the vicinity thereof.

According to the third working example, the high-reflective film 121 is provided on the second surface of the KBBF crystal 120, which is a surface that reflects the pulsed laser beams 31b and 31, and thus the pulsed laser beams 31b and 31 can be reflected with a higher degree of reflectance. Through this, a higher-energy pulsed laser beam 31 can be generated. In addition, because the entirety of the second surface of the KBBF crystal 120 makes contact with the heatsink 431 through the comparatively thin high-reflective film 121, the KBBF crystal 120 can be cooled more efficiently. This makes it possible to increase the efficiency at which the KBBF crystal 120 is cooled. Furthermore, because the KBBF crystal 120 can be cooled by the heatsink 431 from the second surface, which is the main surface of the KBBF crystal 120, a rise in the temperature of the KBBF crystal 120 can be effectively suppressed.

4.4.4 Cooling System Through High-Heat Thermal Conductive Film (Fourth Working Example)

Figure 7:
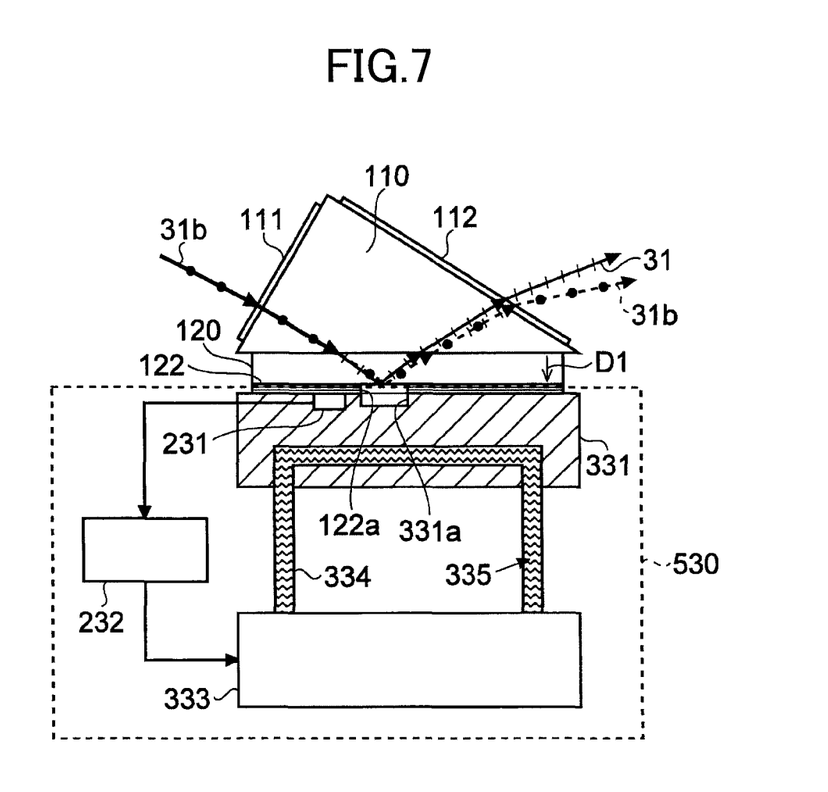
FIG. 7 is a schematic diagram illustrating the overall configuration of a cooling mechanism according to a fourth working example of the second embodiment.
Figure 8:
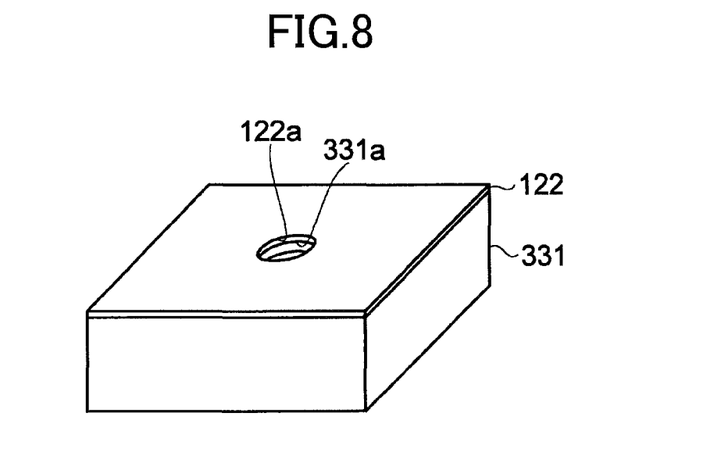
FIG. 8 is a perspective view illustrating the overall configuration of a heatsink and a high thermal conductivity portion shown in FIG. 7.

Next, a cooling mechanism 530 that is a variation on the cooling mechanism 330 according to the second working example will be described as a fourth working example of the cooling mechanism 130. FIG. 7 schematically illustrates the overall configuration of the cooling mechanism 530 according to the fourth working example. FIG. 8 is a perspective view illustrating the overall configuration of the heatsink 331 and a high thermal conductivity portion 122 shown in FIG. 7. Note that in the following descriptions, elements that are the same as those described earlier will be given the same reference numerals, and redundant descriptions thereof will be omitted.

As can be seen by comparing FIG. 4 with FIG. 7, the cooling mechanism 530 according to the fourth working example may have the same configuration as the cooling mechanism 330 according to the second working example. In addition, the cooling mechanism 530 may further include the high thermal conductivity portion 122.

The high thermal conductivity portion 122 may be provided between the KBBF crystal 120 and the heatsink 331. The high thermal conductivity portion 122 may be a film formed on the second surface of the KBBF crystal 120. In this case, it is preferable for the high thermal conductivity portion 122 and the heatsink 331 to be close-contacted together. However, the invention is not limited thereto. For example, the high thermal conductivity portion 122 may be a film formed on the heatsink 331. In this case, it is preferable for the high thermal conductivity portion 122 and the KBBF crystal 120 to be close-contacted together. Furthermore, the high thermal conductivity portion 122 may be a film-form sheet member, a plate-shaped member, or the like. In this case, it is preferable for the high thermal conductivity portion 122 to be close-contacted to the KBBF crystal 120 and the heatsink 331.

It is preferable for the high thermal conductivity portion 122 to have a higher thermal conductivity than the KBBF crystal 120. The material of the high thermal conductivity portion 122 may be diamond, diamond-like carbon, or the like.

As shown in FIG. 8, the high thermal conductivity portion 122 may include a through-hole 122a for aligning the positions of the heatsink 331 and the recess portion 331a. A pure gas such as, for example, air, nitrogen, an inert gas such as He, Ar, or the like may be present within the space formed in the through-hole 122a and the recess portion 331a by sandwiching the high thermal conductivity portion 122 between the KBBF crystal 120 and the heatsink 331. Alternatively, this space may be maintained in a vacuum state. It is preferable for the shape of the opening of the through-hole 122a to resemble the cross-sectional beam shape of the pulsed laser beams 31b and 31.

Note that in the fourth working example, the heatsink 431 that lacks the recess portion 331a of the third working example may be employed instead of the heatsink 331. In this case, the through-hole 122a may be provided in a region that corresponds to a region in the second surface of the KBBF crystal 120 that at least reflects the pulsed laser beams 31b and 31. Furthermore, the through-hole 122a is not limited to a hole that passes through the high thermal conductivity portion 122, and may be an indentation instead.

According to the fourth working example, the heatsink 331 is close-contacted to the KBBF crystal 120 with the high thermal conductivity portion 122, which has a high thermal conductivity, interposed there between, and thus the KBBF crystal 120 can be more efficiently cooled. Furthermore, the temperature distribution in the KBBF crystal 120 can be made uniform. Through this, damage such as cracking due to temperature distribution imbalances can be reduced.

4.4.5 Cooling System Through High-Reflective Film and High-Heat Thermal Conductive Film (Fifth Working Example)

Figure 9:
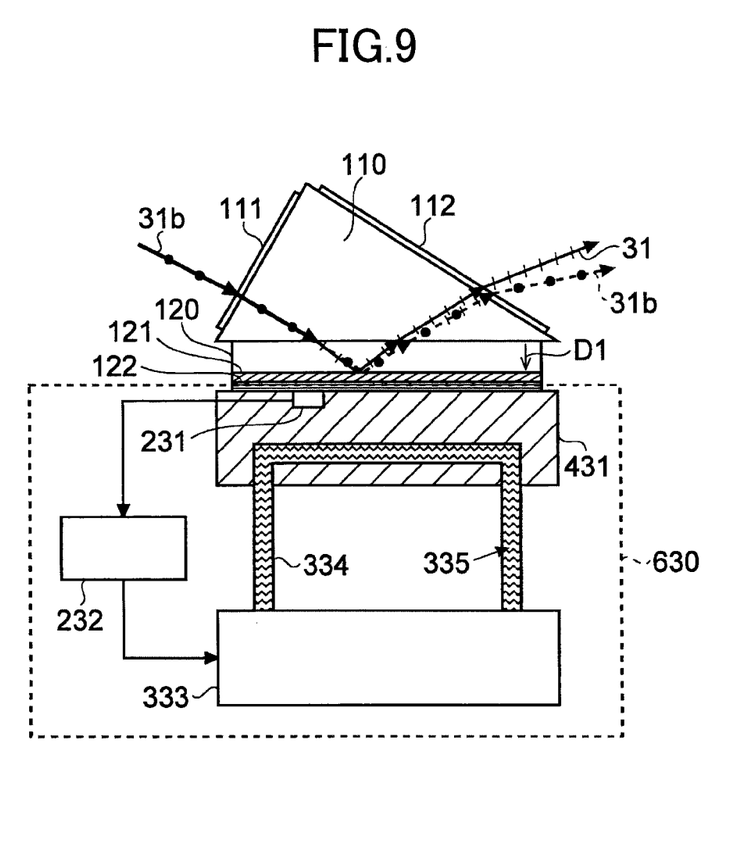
FIG. 9 is a schematic diagram illustrating the overall configuration of a cooling mechanism according to a fifth working example of the second embodiment.

Next, a cooling mechanism 630 that combines the high-reflective film 121 according to the third working example with the high thermal conductivity portion 122 according to the fourth working example will be described as a fifth working example of the cooling mechanism 130. FIG. 9 schematically illustrates the overall configuration of the cooling mechanism 630 according to the fifth working example. Note that in the following descriptions, elements that are the same as those described earlier will be given the same reference numerals, and redundant descriptions thereof will be omitted.

As can be seen by comparing FIG. 6, FIG. 7, and FIG. 9, the cooling mechanism 630 according to the fifth working example may further include the high thermal conductivity portion 122 in addition to having the same configuration as the cooling mechanism 430 according to the third working example.

The high-reflective film 121 may be provided on the second surface of the KBBF crystal 120. The high thermal conductivity portion 122 may be provided between the high-reflective film 121 and the heatsink 431. The high thermal conductivity portion 122 may be the same as the high thermal conductivity portion 122 according to the fourth working example. However, the through-hole 122a of the aforementioned high thermal conductivity portion 122 may be omitted from this high thermal conductivity portion 122.

According to the fifth working example, in addition to the effects of the third working example, the KBBF crystal 120 can be more efficiently cooled. Furthermore, like the fourth working example, the temperature distribution of the KBBF crystal 120 can be made uniform, and thus damage such as cracking due to temperature distribution imbalances can be reduced.

5. Wavelength Conversion Device Combining Multiple Prisms and Cooling Mechanism (Third Embodiment)

Next, a wavelength conversion device according to a third embodiment of the present disclosure will be described in detail using the drawings. Like the second embodiment, in the third embodiment, the portion described as the second wavelength conversion element 92 in the first embodiment will be focused on, and the configuration thereof will be described in more detail. Note that the first wavelength conversion element 91 may also have the same configuration as that described as an example herein after.

In the aforementioned second embodiment, the same prism 110 is used as both the optical element for adjusting the refractive index for the pulsed laser beam 31b that enters into the KBBF crystal 120 and the optical element for adjusting the refractive index for the pulsed laser beams 31b and 31 that exit from the KBBF crystal 120. As opposed to this, in the third embodiment, individual optical elements for refractive index adjustment (i.e. refractive index adjustment elements) may be provided for the pulsed laser beam 31b that enters into the KBBF crystal 120 and the pulsed laser beams 31b and 31 that exit from the KBBF crystal 120. This will be described herein after using a specific example.

5.1 Combination of Entry Prism, Exit Prism, and Cooling Mechanism (First Working Example)

Figure 10:
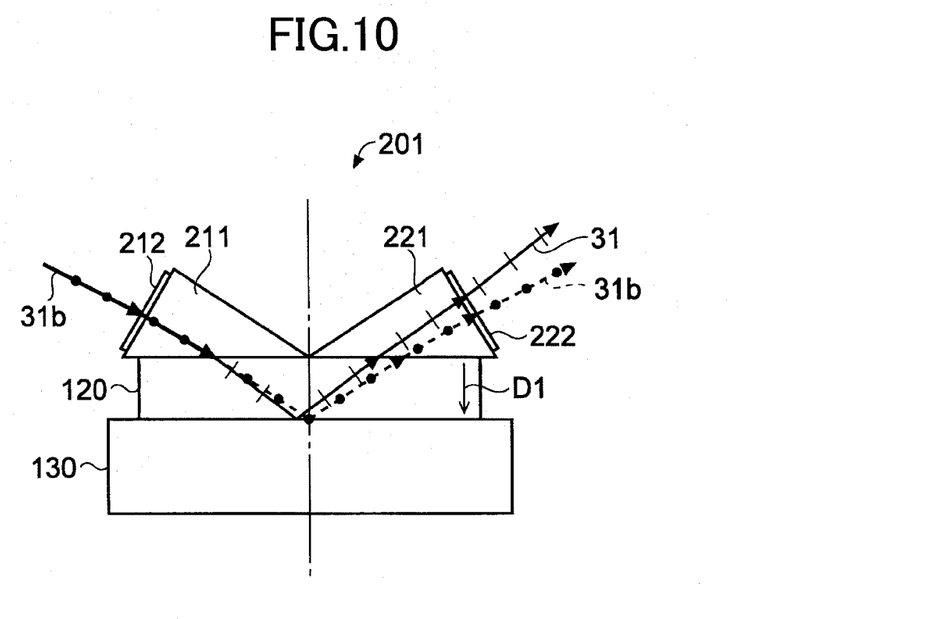
FIG. 10 is a schematic diagram illustrating the overall configuration of a wavelength conversion device according to a first working example of a third embodiment of the present disclosure.

FIG. 10 schematically illustrates the overall configuration of a wavelength conversion device 201 according to a first working example of the third embodiment. As shown in FIG. 10, the wavelength conversion device 201 may include an entry prism 211, an exit prism 221, the KBBF crystal 120, and the cooling mechanism 130.

The pulsed laser beam 31b may enter into the entry prism 211 from the exterior. The entry prism 211 may then conduct the pulsed laser beam 31b that has entered to the KBBF crystal 120. The pulsed laser beams 31b and 31 that have exited from the KBBF crystal 120 may then enter into the exit prism 221. The exit prism 221 may then emit, to the exterior, the pulsed laser beams 31b and 31 that have entered.

In the first working example, the pulsed laser beam 31b that has entered from the first surface of the KBBF crystal 120 may exit from the first surface after being highly-reflected by the second surface of the KBBF crystal 120. Accordingly, the entry prism 211 and the exit prism 221 may both be disposed on the first surface of the KBBF crystal 120.

The optical path of the pulsed laser beam 31b that has entered into the KBBF crystal 120 includes the location of entry into the second surface and is symmetrical with a line that is perpendicular to the second surface serving as the axis of symmetry. Accordingly, the entry prism 211 and the exit prism 221 may be disposed on the first surface in plane symmetry, with the plane perpendicular to the first surface of the KBBF crystal 120 serving as a mirror plane.

The entry surface of the entry prism 211 may be coated with an anti-reflection film (AR coating) 212 that reduces the reflection of the pulsed laser beam 31b. The exit surface of the exit prism 221 may be coated with an anti-reflection film (AR coating) 222 that reduces the reflection of at least the pulsed laser beam 31. The contact between the entry prism 211 and exit prism 221 and the KBBF crystal 120 may be optical contact. The KBBF crystal 120 may come into direct contact with the entry prism 211 and the exit prism 221, or may make contact with a film (not shown) interposed there between. This film may be a film that includes at least one of $SiO_2$, $MgF_2$, $LaF_3$, and $GdF_3$. It is particularly favorable to use a fluoride-based material that is robust to an ultra violet laser beam for the material of the film on the exit prism 221 side. Meanwhile, it is preferable to use the same type of material as the material of the entry prism 211 and the exit prism 221 for the material of the film.

According to the first working example, it is acceptable to dispose the entry prism 211 and the exit prism 221 in plane symmetry, and thus the design can be made simple.

5.2 Combination of Entry Prism, Exit Prism, and Cooling Mechanisms (Second Working Example)

Figure 11:
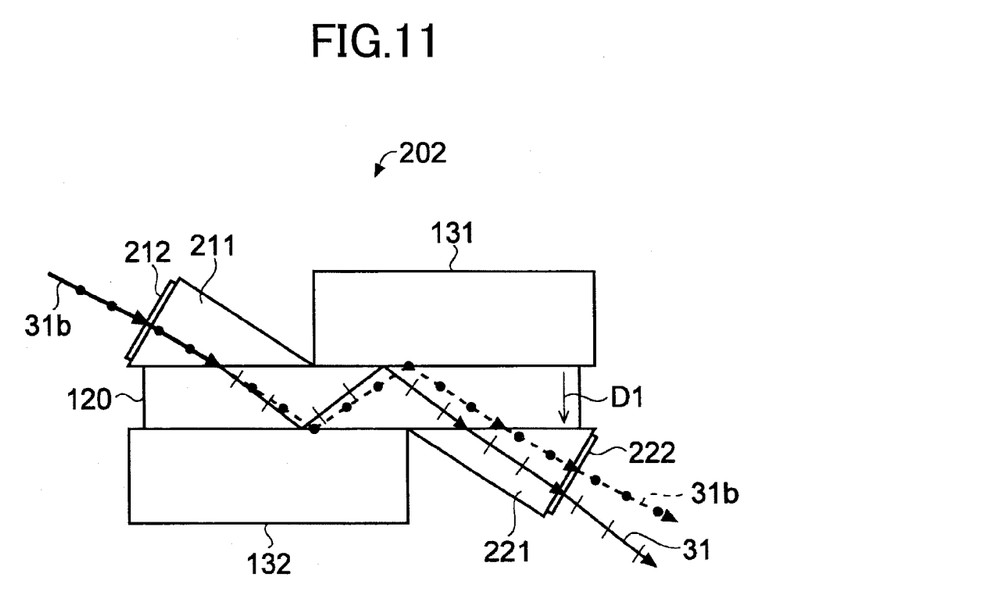
FIG. 11 is a schematic diagram illustrating the overall configuration of a wavelength conversion device according to a second working example of the third embodiment of the present disclosure.

FIG. 11 schematically illustrates the overall configuration of a wavelength conversion device 202 according to a second working example of the third embodiment. As shown in FIG. 11, the wavelength conversion device 202 may include the entry prism 211, the exit prism 221, the KBBF crystal 120, and cooling mechanisms 131 and 132.

In the second working example, the pulsed laser beam 31b that has entered from the first surface of the KBBF crystal 120 may be highly-reflected by the second surface of the KBBF crystal 120, may furthermore be highly-reflected by the first surface of the KBBF crystal 120, and may then exit from the second surface. Accordingly, the entry prism 211 may be disposed on the first surface of the KBBF crystal 120. Meanwhile, the exit prism 221 may be disposed on the second surface of the KBBF crystal 120.

The cooling mechanism 131 may be disposed in a region of the first surface of the KBBF crystal 120 in which the entry prism 211 is not disposed. The cooling mechanism 131 may be the same as the aforementioned cooling mechanism 130. Meanwhile, the cooling mechanism 132 may be disposed in a region of the second surface of the KBBF crystal 120 in which the exit prism 221 is not disposed. The cooling mechanism 132 may be the same as the aforementioned cooling mechanism 130.

According to the second working example, the optical path through which the pulsed laser beam 31b advances in the KBBF crystal 120 can be lengthened, which makes it possible to improve the efficiency of the wavelength conversion. In addition, because both the first surface and the second surface of the KBBF crystal 120 can be cooled, the KBBF crystal 120 can be cooled efficiently.

5.3 Combination of Entry Prism, Exit Prism, and Cooling Mechanisms (Third Working Example)

Figure 12:
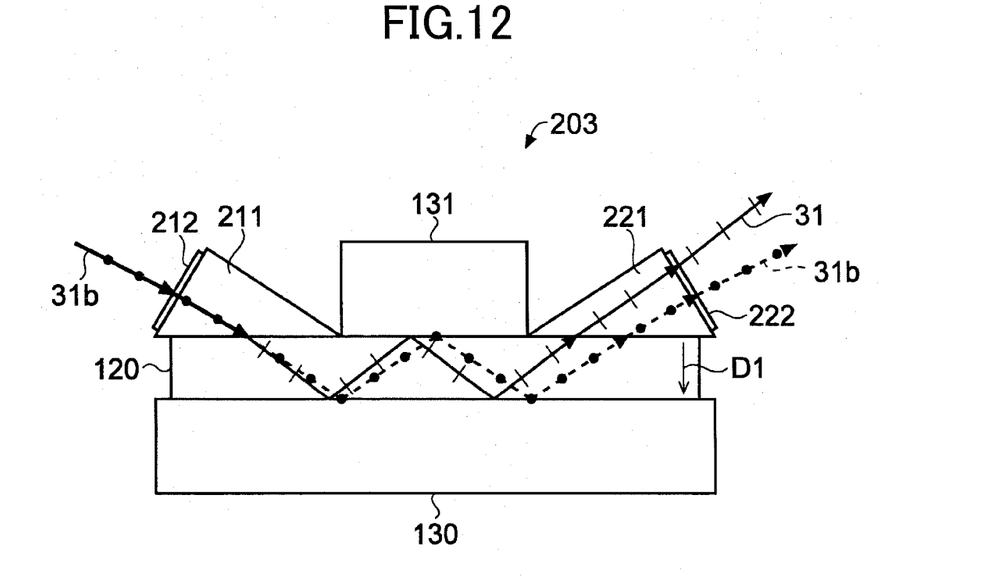
FIG. 12 is a schematic diagram illustrating the overall configuration of a wavelength conversion device according to a third working example of the third embodiment of the present disclosure.

FIG. 12 schematically illustrates the overall configuration of a wavelength conversion device 203 according to a third working example of the third embodiment. As shown in FIG. 12, the wavelength conversion device 203 may include the entry prism 211, the exit prism 221, the KBBF crystal 120, and the cooling mechanisms 130 and 131.

In the second working example, the pulsed laser beam 31b that has entered from the first surface of the KBBF crystal 120 may be highly-reflected by the second surface of the KBBF crystal 120, may furthermore be highly-reflected by the first surface of the KBBF crystal 120, may further still be highly-reflected by the second surface again, and may then exit from the first surface. Accordingly, the entry prism 211 and the exit prism 221 may both be disposed on the first surface of the KBBF crystal 120 at a distance from each other.

The cooling mechanism 131 may be disposed in a region of the first surface of the KBBF crystal 120 that is between the entry prism 211 and the exit prism 221. The cooling mechanism 131 may be the same as the aforementioned cooling mechanism 130. The stated cooling mechanism 130 may be provided on the second surface of the KBBF crystal 120.

According to the third working example, the optical path through which the pulsed laser beam 31b advances in the KBBF crystal 120 can be lengthened further, which makes it possible to improve the efficiency of the wavelength conversion. In addition, because both the first surface and the second surface of the KBBF crystal 120 can be cooled, the KBBF crystal 120 can be cooled efficiently.

6. Wavelength Conversion Device Incorporating Cooling Mechanism when Light Enters or Exits from End Surface of Nonlinear Optical Crystal (Fourth Embodiment)

Next, a wavelength conversion device according to a fourth embodiment of the present disclosure will be described in detail using the drawings. Like the second embodiment, in the fourth embodiment, the portion described as the second wavelength conversion element 92 in the first embodiment will be focused on, and the configuration thereof will be described in more detail. Note that the first wavelength conversion element 91 may also have the same configuration as that described as an example herein after.

Figure 13:
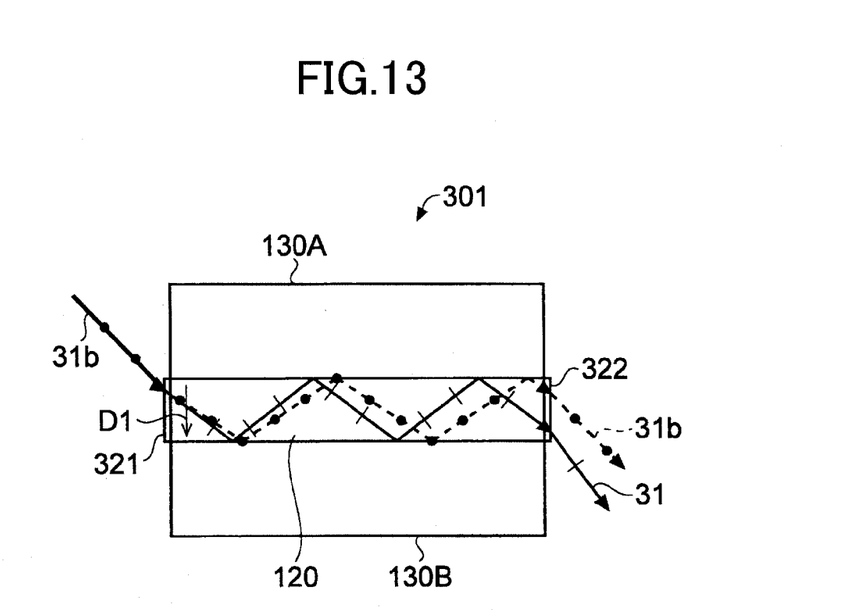
FIG. 13 is a schematic diagram illustrating the overall configuration of a wavelength conversion device according to a fourth embodiment of the present disclosure.

FIG. 13 schematically illustrates the overall configuration of a wavelength conversion device 301 according to the fourth embodiment. As shown in FIG. 13, the wavelength conversion device 301 may include the KBBF crystal 120 and cooling mechanisms 130A and 130B.

The pulsed laser beam 31b may enter from an end surface of the KBBF crystal 120. Hereinafter, for descriptive purposes, this end surface will be referred to as an "entry surface". Some of the pulsed laser beam 31b that has advanced within the KBBF crystal 120 may undergo wavelength conversion into the pulsed laser beam 31 while traveling through the KBBF crystal 120. The generated pulsed laser beam 31 and the remaining pulsed laser beam 31b may be reflected by the first surface and second surface of the KBBF crystal 120, and may then exit from an exit surface that is on the opposite side as the entry surface. Note that the entry surface and the exit surface may be approximately perpendicular to the first surface and the second surface, respectively.

The entry surface of the KBBF crystal 120 may be provided with an anti-reflection film (AR coating) 321 that suppresses the reflection of the pulsed laser beam 31b, which is an S-polarized laser beam on that end and has a wavelength of approximately 386.8 nm ($2\omega$). Meanwhile, the exit end surface of the KBBF crystal 120 may be provided with an anti-reflection film (AR coating) 322 that suppresses the reflection of the pulsed laser beam 31b, which is an S-polarized laser beam on that end, and the pulsed laser beam 31, which is a P-polarized laser beam on that end.

The cooling mechanism 130A may be provided on the entirety of the first surface of the KBBF crystal 120. The cooling mechanism 130B may be provided on the entirety of the second surface of the KBBF crystal 120. The cooling mechanisms 130A and 130B may both be the same as the aforementioned cooling mechanism 130.

According to the fourth embodiment, the optical path through which the pulsed laser beam 31b advances in the KBBF crystal 120 can be lengthened further, which makes it possible to improve the efficiency of the wavelength conversion. In addition, because the KBBF crystal 120 can be cooled over the entirety of both main surfaces that oppose each other, the KBBF crystal 120 can be cooled efficiently.

The description above is not intended to be limiting, but only to provide examples. It is clear for the skilled person that various changes and modifications can be made in the embodiments in this disclosure without departing from the spirit and scope of the appended claims.

The terms used in this specification and the appended claims should be construed as non-limiting. For example, the terms "comprise" and "include" should be construed as "include but not be limited to." The term "have" should be construed as "have but not be limited to." The indefinite article "a/an" used in this specification and the appended claims should be construed as "at least one" or "one or more."

While a single amplifier 7 is provided in the embodiments described above, a plurality of amplifiers 7 may be used instead. While the Ti:sapphire laser 6 and the amplifier 7 are pumped by the common pumping laser 5, separate pumping lasers may be used instead. As the pumping laser 5, a laser that generates second harmonic light of an Nd:YLF laser or an Nd:YVO$_4$ laser may be used. Instead of the Ti:sapphire laser 6, a laser that generates second harmonic light of an erbium-doped optical fiber laser may be used. This laser may be pumped by a semiconductor laser. The wavelength conversion device 9 is not limited to the structures described in this disclosure, and may take any form as long as it converts incident light into light whose wavelength is in the gain bandwidth of the amplifying apparatus 3, e.g., approximately 193 nm. Examples of wavelength conversion elements included in the wavelength conversion device 9 may include a cesium lithium triborate (CLBO) crystal, instead of the LBO crystal 9.

What is claimed is:

1. A wavelength conversion device comprising:
   a first wavelength conversion element and a second wavelength conversion element, the first wavelength conversion element being configured to convert an entering first laser beam into a second laser beam by a first wavelength conversion, the second wavelength conversion element being configured to convert the entering second laser beam into a third laser beam by a second wavelength conversion, the second wavelength conversion element including at least one reflective surface that reflects the second and third laser beams traveling therethrough at least one time, the first wavelength conversion element being arranged so as to reflect the second laser beam onto the at least one of reflective surface in the second wavelength conversion element; and
   a cooling mechanism that cools the second wavelength conversion element from at least one of the reflective surfaces of the second wavelength conversion element by using a fluid.

2. The wavelength conversion device according to claim 1, wherein the second wavelength conversion element includes a nonlinear optical crystal; and
   the nonlinear optical crystal includes the at least one reflective surface that reflects the second and third laser beams traveling through the nonlinear optical crystal at least one time.

3. The wavelength conversion device according to claim 2, wherein the nonlinear optical crystal is $KBe_2BO_3F_2$.

4. The wavelength conversion device according to claim 2, further comprising a refractive index adjustment element that makes contact with an entry surface at which the second laser beam enters into the nonlinear optical crystal.

5. The wavelength conversion device according to claim 4, wherein the nonlinear optical crystal includes a coating film on a contact surface with the refractive index adjustment element; and
   the contact surface is an optical contact surface between the refractive index adjustment element and the coating film.

6. The wavelength conversion device according to claim 4, wherein the refractive index adjustment element includes a prism.

7. The wavelength conversion device according to claim 2, further comprising:
   a first refractive index adjustment element that makes contact with the nonlinear optical crystal in a region where the second laser beam enters; and
   a second refractive index adjustment element that makes contact with the nonlinear optical crystal in a region where the third laser beam exits.

8. The wavelength conversion device according to claim 7, wherein the first refractive index adjustment element makes contact with the nonlinear optical crystal in a part of the surface where the second laser beam enters;
   the second refractive index adjustment element makes contact with the nonlinear optical crystal in a part of the surface where the third laser beam exits; and
   the cooling mechanism cools the nonlinear optical crystal from both the surface of the nonlinear optical crystal where the second laser beam enters and the surface of the nonlinear optical crystal where the third laser beam exits.

9. The wavelength conversion device according to claim 7, wherein the first refractive index adjustment element and the second refractive index adjustment element make contact with the same surface of the nonlinear optical crystal at a distance from each other; and
   the cooling mechanism cools the nonlinear optical crystal from the surface of the nonlinear optical crystal on the opposite side as the surface with which the first and second refractive index adjustment elements make contact, and cools the nonlinear optical crystal from an area of the nonlinear optical crystal located between the first refractive index adjustment element and the second refractive index adjustment element.

10. The wavelength conversion device according to claim 2,
wherein the nonlinear optical crystal includes:
an entry surface into which the second laser beam enters; and
two reflective surfaces that are opposed to each other and intersect with the entry surface approximately orthogonally,
wherein the cooling mechanism cools the nonlinear optical crystal from both of the reflective surfaces.

11. The wavelength conversion device according to claim 1, further comprising:
a temperature sensor that detects a temperature of the second wavelength conversion element; and
a temperature controller that drives the cooling mechanism based on the temperature of the second wavelength conversion element detected by the temperature sensor.

12. The wavelength conversion device according to claim 1, wherein the cooling mechanism includes an air-cooling device that blows a gas on at least one of the reflective surfaces of the second wavelength conversion element.

13. The wavelength conversion device according to claim 1,
wherein the cooling mechanism includes:
a cooling member that makes contact with at least one of the reflective surfaces of the second wavelength conversion element and that has a higher thermal conductivity than the second wavelength conversion element; and
a cooling device that cools the cooling member.

14. The wavelength conversion device according to claim 13,
wherein the cooling member includes a pipe inside of the cooling member; and
the cooling device causes cooling water to flow within the pipe.

15. The wavelength conversion device according to claim 13,
wherein the second wavelength conversion element includes a nonlinear optical crystal;
the nonlinear optical crystal includes the at least one reflective surface that reflects the second and third laser beams traveling through the nonlinear optical crystal at least one time; and
the cooling member makes contact with at least one of the reflective surfaces of the nonlinear optical crystal.

16. The wavelength conversion device according to claim 15, wherein the cooling member has a recess in one part of the contact surface with the nonlinear optical crystal.

17. The wavelength conversion device according to claim 16,
wherein the recess is provided in a region that corresponds to a region of the reflective surface in the nonlinear optical crystal that reflects at least the second and third laser beams.

18. The wavelength conversion device according to claim 15,
wherein the second wavelength conversion element includes a high-reflection film in a region of the reflective surface in the nonlinear optical crystal that reflects at least the second and third laser beams.

19. The wavelength conversion device according to claim 15,
wherein the second wavelength conversion element includes a high thermal conductivity portion that has a higher thermal conductivity than the nonlinear optical crystal and is disposed between the nonlinear optical crystal and the cooling member.

20. The wavelength conversion device according to claim 19, wherein the high thermal conductivity portion includes at least one of a coating film, a sheet member, and a plate member.

21. The wavelength conversion device according to claim 19, wherein the high thermal conductivity portion makes contact with the nonlinear optical crystal and has a recess in one part of the contact surface with the nonlinear optical crystal.

22. The wavelength conversion device according to claim 21,
wherein the recess is provided in a region that corresponds to a region of the reflective surface in the nonlinear optical crystal that reflects at least the second and third laser beams.

23. The wavelength conversion device according to claim 19,
wherein the second wavelength conversion element includes a high-reflection film in a region of the reflective surface in the nonlinear optical crystal that reflects at least the second and third laser beams.

24. A solid-state laser apparatus comprising:
a laser that outputs laser beam;
an amplifier that amplifies the laser beam; and
the wavelength conversion device according to claim 1 that converts the wavelength of the amplified laser beam.

25. A laser system comprising:
the solid-state laser apparatus according to claim 24; and
an amplifying apparatus that amplifies laser beam outputted from the solid-state laser apparatus.

* * * * *